United States Patent [19]

Gimple

[11] Patent Number: 4,798,341

[45] Date of Patent: Jan. 17, 1989

[54] SPRAY GUN FOR ROBOT MOUNTING

[75] Inventor: James J. Gimple, Oregon, Ohio

[73] Assignee: The DeVilbiss Company, Toledo, Ohio

[21] Appl. No.: 101,881

[22] Filed: Sep. 28, 1987

[51] Int. Cl.⁴ .......................... B05B 5/08; B05B 5/02
[52] U.S. Cl. ..................................... 239/694; 901/43; 118/697; 118/629; 239/239; 239/706; 239/708; 239/290
[58] Field of Search .................. 901/43; 118/684, 696, 118/697, 698, 702, 629, 302; 239/690, 708, 290, 291, DIG. 14, 587, 412, 706, 694

[56] References Cited

U.S. PATENT DOCUMENTS

| | | | |
|---|---|---|---|
| 4,568,026 | 2/1986 | Baun | 239/551 |
| 4,593,360 | 6/1986 | Cocks | 118/696 |
| 4,598,871 | 7/1986 | Hartle | 239/706 |
| 4,613,082 | 9/1986 | Gimple et al. | 239/690 |
| 4,660,771 | 4/1987 | Chabert et al. | 239/708 |
| 4,679,734 | 7/1987 | Mommsen et al. | 239/692 |
| 4,754,923 | 7/1988 | Matusita et al. | 118/697 |

FOREIGN PATENT DOCUMENTS 2171222 8/1986 United Kingdom ............... 901/43

*Primary Examiner*—Andres Kashnikow
*Assistant Examiner*—Chris Trainor
*Attorney, Agent, or Firm*—MacMillan, Sobanski & Todd

[57] ABSTRACT

An improved spray gun for mounting on a programmable industrial robot. A housing and manifold are attached to the robot and a spray head is removably attached to the manifold. The manifold includes fluid passages for supplying liquid, atomization air, fan air and pilot air to the spray head and for returning fluid from the spray head. A remotely controlled regulator is located in the manifold liquid passage and a remotely controlled valve is located in the manifold fluid return passage. One or two electrically actuated pilot valves supply pilot air to simultaneously operate atomization air and pattern shaping air control valves in the manifold passages and to operate a trigger valve in the spray head. A power supply module may be located in the housing for applying an electrostatic voltage through the manifold to the spray head for charging the coating liquid.

6 Claims, 8 Drawing Sheets

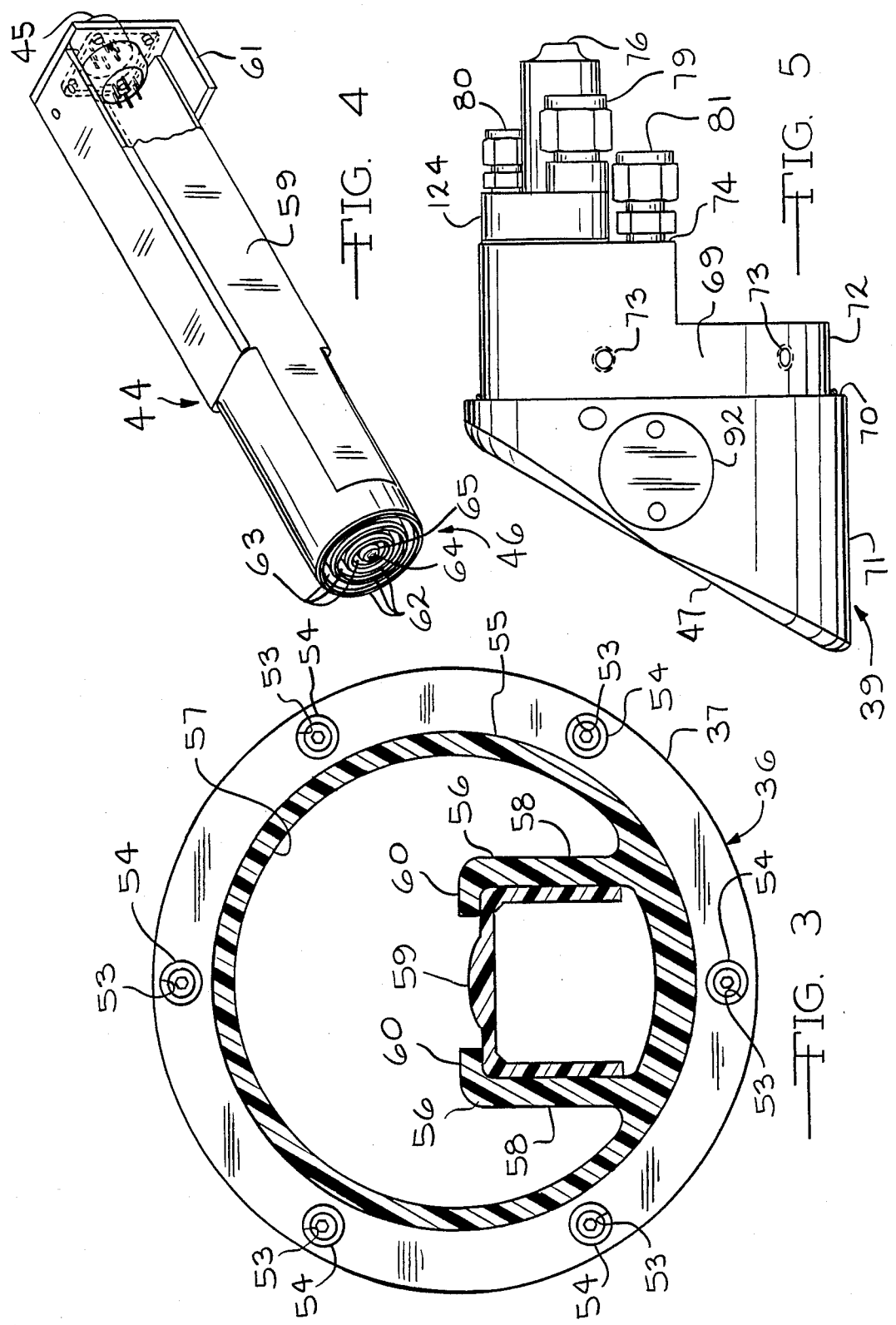

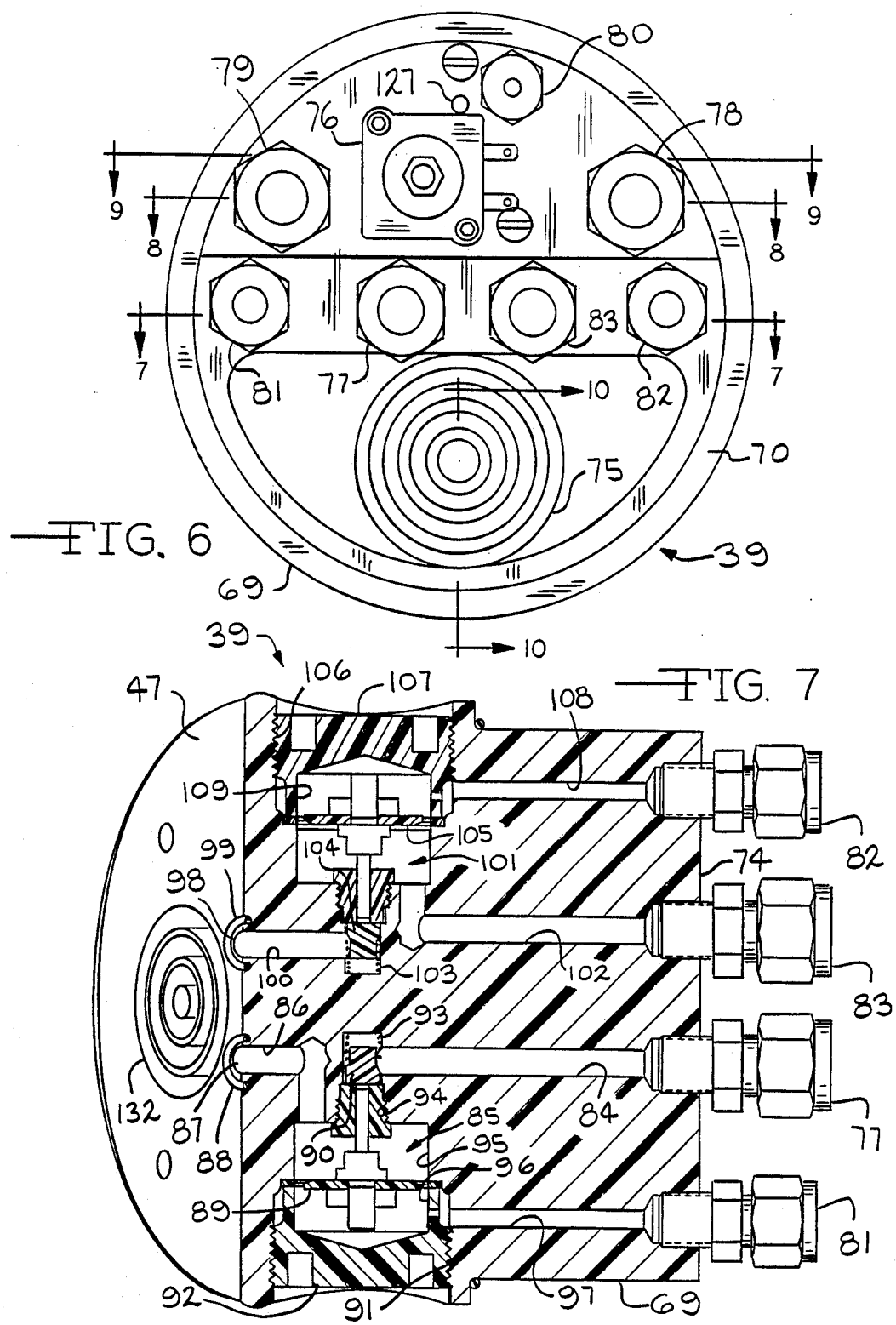

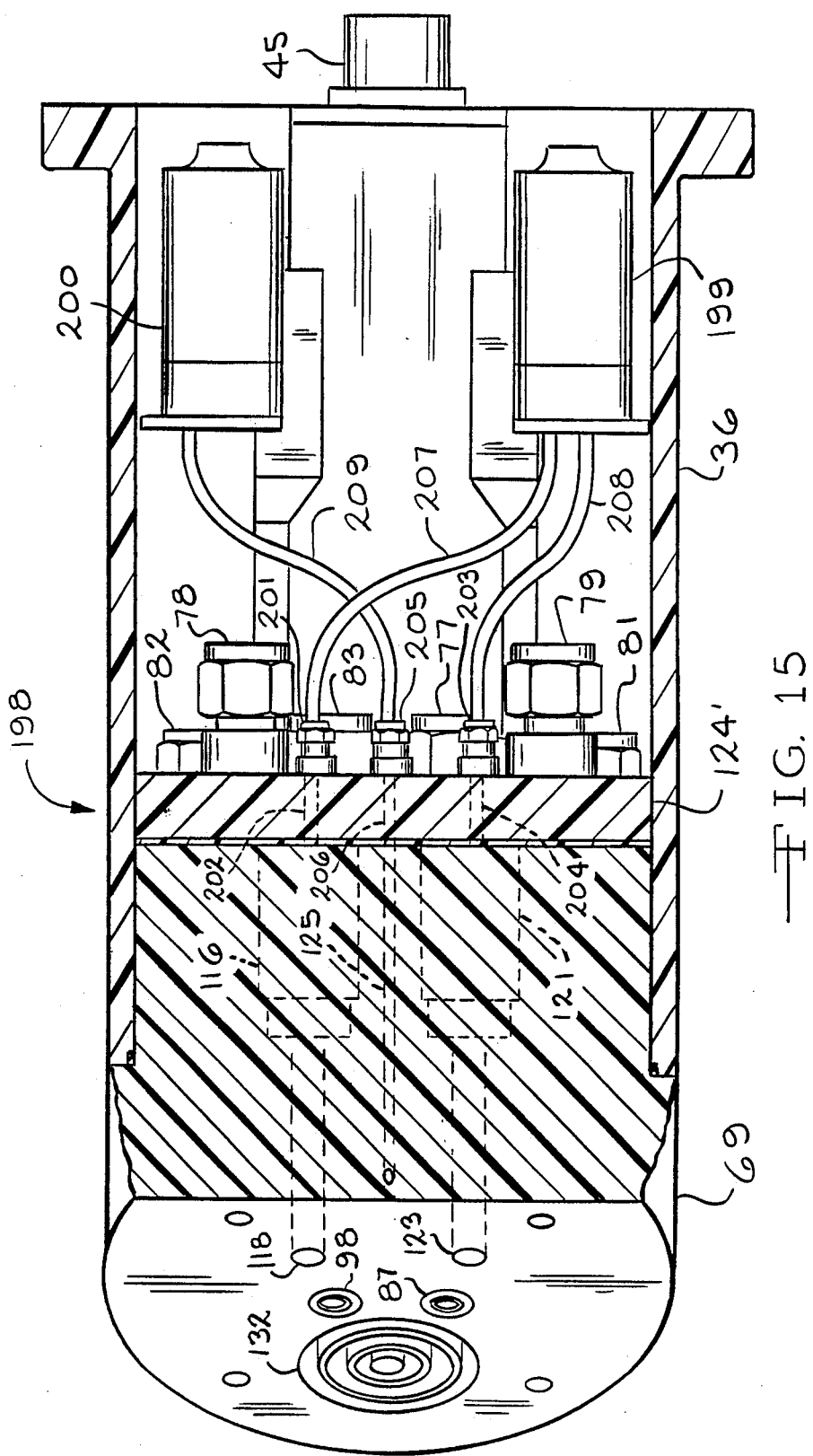

SPRAY GUN FOR ROBOT MOUNTING

TECHNICAL FIELD

The invention relates to coating apparatus and more particularly to an improved spray gun for mounting on a programmable industrial robot. The spray gun is fully controlled by a remote programmable controller and is easily serviced.

BACKGROUND ART

One method for using a spray gun on an automated production line is to mount the spray gun on a programmable industrial robot. Robots have several advantages when used for spray painting. The flexibility of the robot arm allows coating highly irregular shapes such as vehicle bodies. The robot arm is capable of following the irregular surfaces of a vehicle body and also is capable of reaching into the interior of the body. Also, the robot may be programmed to coat successive articles having different configurations and it is readily programmable to coat articles different from previously coated articles.

Normally, a wrist is attached to the end of the robot arm for mounting the spray gun. The arm moves to position the spray gun in space and the wrist provides two or three axes of motion for aiming the spray gun relative to the end of the arm. However, there is a limit to the weight which can be mounted on the arm and wrist without interfering with operation of the robot. Also, it is desirable to limit the overall size of the spray gun. In the past, many robot mounted spray guns have been unnecessarily large and have been difficult to service. The robot mounted spray guns are not easily removed from the robot and have sometimes required excessive system down time for repairs. Ideally, the spray gun is easily removed from the robot wrist and replaced to minimize down time. The removed gun then is serviced without unnecessary delay to production.

Remote actuated spray guns used in automated spray systems have traditionally been activated using solenoid controlled air valves triggered by a programmable controller for the system. The solenoid valve is usually found outside the spray booth and is located in an electro-pneumatic cabinet. From the cabinet, relatively long air lines connect to the spray gun. This design concept can cause significant delays in gun triggering time because of the capacitance of the air lines. This may be particularly important during a color change cycle when the gun may be triggered on and off several times while purging paint from the gun and its supply lines.

When a spray gun is used on a programmable spray painting robot, finite control of both the air and the fluid must be established. Robots may move, for example, at a normal speed of four feet per second. This converts to a spray gun movement of approximately 2.5 inches in 50 milliseconds. Therefore, if the solenoid actuated pneumatic trigger valve is located at a considerable distance from the spray gun, long delays with accompanying long lead distances are inherent in the system. Additionally, it is common practice in the automotive industry to program a robots' painting path and triggering points within a teaching spray booth. The program is then uploaded to the actual paint spray booths. Each paint spray booth may have different locations for the pneumatic solenoid control valves. This usually means that the hose lengths between the gun and the control valves are different lengths. These different lengths cause different response times between the valves and the gun.

A single air line is commonly connected to the spray gun for supplying atomization air and pattern shaping air to the gun nozzle. The gun may include separate valves for controlling atomization air and pattern shaping air. However, these valves are not remotely adjustable by the system controller. At best, the system controller can independently turn on and off the pattern shaping air valve to select either a round spray pattern or a fan pattern. The size of the fan pattern must be manually adjusted at the spray gun.

DISCLOSURE OF INVENTION

The spray gun of the invention is designed for mounting on an programmable industrial robot of the type commonly used on production lines. The spray gun generally includes a housing attached to a wrist on the end of a robot arm, a manifold attached to the housing and a spray head removably attached to the manifold. The housing, the manifold and a spray head body are made from a relatively light weight electrically nonconductive material. A power supply module located in the housing converts a low voltage to a very high voltage which is applied through the manifold to the spray head for electrostatic charging atomized coating liquid material.

The spray gun is easily serviced since the spray head is easily removed from the manifold without the need to disconnect individual fluid and electrical lines and is easily replaced. The removed spray head can be serviced with minimal down time for the coating system. The power supply module also is easily replaced to minimize down time during service.

The manifold includes passages for supplying liquid, atomization air, pattern shaping air and pilot air to the spray head and for receiving return fluid from the spray head. The spray head has a trigger actuated valve responsive to pilot air for spraying atomized coating liquid received from the liquid passage in the manifold. The manifold includes normally closed valves in the atomization air and pattern air passages which are responsive to the pilot air. Either a single actuating valve on the manifold simultaneously supplies pilot air to the atomization air and pattern air valves and to the spray head trigger in response to an electric signal from the system controller or two separate valves located in the housing supply pilot air to the atomization air and pattern air valves and separately to the spray head trigger in response to timed electric signals from the system controller. By mounting the actuating valve in the spray gun, triggering delays which were present in prior art systems are virtually eliminated.

The manifold also has a pneumatically controlled pressure regulator in the liquid passage and a pneumatically controlled valve in the return passage. The regulator and valve are controlled by air supplied from a location remote from the spray gun. By locating the regulator, the return valve and the trigger valve within inches of the spray head's nozzle, quick, clean color change cycles can be accomplished. The pressure regulator and the return valve are easily removed from the manifold for service without removing other components from the spray gun.

BRIEF DESCRIPTION OF THE DRAWINGS

FIG. 3 is a cross sectional view through the spray gun housing taken along line 3—3 of FIG. 2, but with the fluid hoses and the power supply circuitry omitted for clarity;

FIG. 4. is a perspective view of the high voltage power supply module;

FIG. 5 is a side elevational view of the valve manifold;

FIG. 6 is a rear elevational view of the valve manifold;

FIG. 7 is a cross sectional view taken along line 7—7 of FIG. 6;

FIG. 15 is a partially broken away top plan view of a modified embodiment of the spray gun housing and manifold.

Best Mode For Carrying Out The Invention

Figure 1:
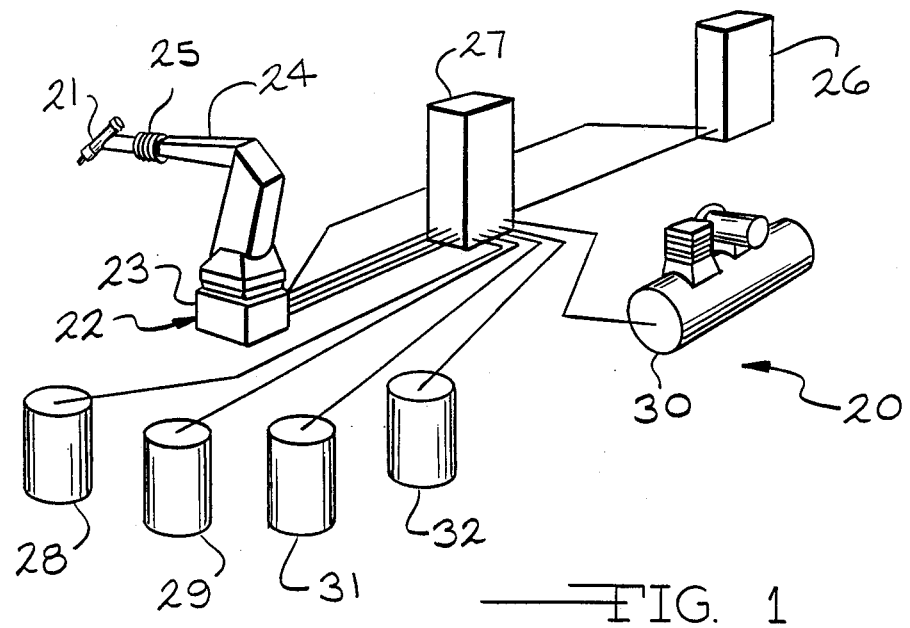
FIG. 1 is a diagrammatic view of a coating system including an industrial robot mounting a spray gun according to the invention and a programmable controller for controlling the robot and the spray gun.

Referring now to the drawings and particularly to FIG. 1, an automated coating system 20 is shown as including a spray gun 21 according to the invention mounted on a programmable robot 22. The illustrated robot 22 includes a base 23 on which a movable arm 24 is mounted. The spray gun 21 is mounted on a wrist 25 attached to the end of the arm 24. In a typical programmable robot 22, the arm has three axes of movement to allow positioning the spray gun 21 at any desired location in the work envelope and the wrist has an additional two or three axes of movement to allow aiming the spray gun 21 in any desired direction.

A programmable controller 26 is connected to the robot 22 for storing program instructions to drive the robot arm 24 through a desired path and to aim the spray gun 21 at a workpiece as it is moved through the path. The robot 22 and the programmable controller 26 are well known in the prior art. Typically, the robot arm 24 is manually led through a path during programming. Path coordinate information is simultaneously generated by internal arm position sensors and is stored in the programmable controller 26. The taught path coordinates are subsequently used to duplicate the path each time a similar workpiece is coated. In some systems, program data is stored for a number of different kinds of workpieces. As different workpieces are conveyed through the coating station, the system recognizes each workpiece and selects the appropriate program to coat such workpiece. In addition to path data, the programmable controller 26 stores information for triggering the spray gun 21 on and off as the spray gun is moved over the surfaces of a workpiece. During a coating cycle, the programmable controller 26 also provides timed signals to a valve cabinet 27 for actuating valves to supply paint from a selected source 28 or 29, for example, for supplying compressed air from a source 30, and for selecting solvent from a source 31 during a color change cycle. During the color change cycle, paint and/or solvent from the spray gun 21 and the connected coating material hoses may be dumped in a container 32.

Figure 2:
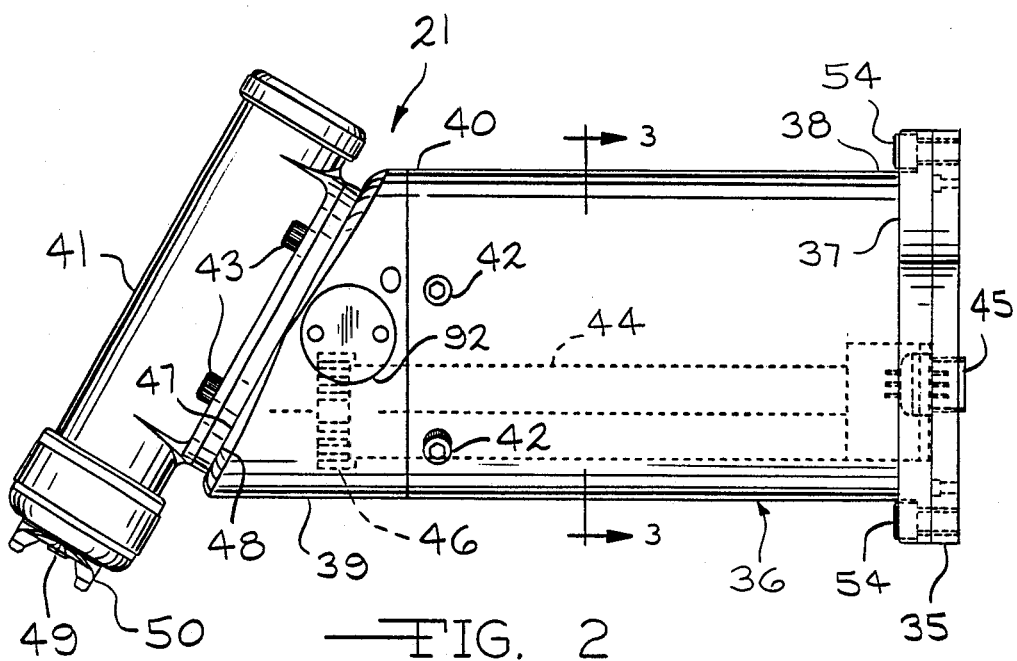
FIG. 2 is a side elevational view of the spray gun of the invention.

A side view of the spray gun 21 is shown in FIG. 2. The spray gun 21 is bolted to an adaptor plate 35 which is attached to the robot wrist 25 (FIG. 1). The spray gun 21 includes a housing 36 having a flange 37 at one end 38 for bolting to the adaptor plate 35, a manifold 39 attached to an opposite housing end 40, and a spray head 41 attached to the manifold 39. The manifold 39 is removably attached by bolts 42 to the housing 36 and the spray head 41 is removably attached by bolts 43 to the manifold 39.

A high voltage module 44 is located inside the housing 36 for converting a low voltage, e.g., about 12 volts, to a high voltage, e.g., about 100,000 volts, for electrostatic charging atomized coating material discharged from the spray head 41. The high voltage module 44 has a connector 45 at one end for connection through a suitable cable (not shown) to the programmable controller 26 (FIG. 1) and has a connector 46 at its opposite end for applying high voltage to the manifold 39. A number of fluid hoses (not shown) extend through the housing 36 for supplying coating liquid, atomization air, pattern shaping air, and pilot air to the manifold 39 and for returning fluid from the manifold 39. The hoses connect to the valve cabinet 27 shown in FIG. 1.

As is discussed in greater detail below, the manifold 39 includes passages for supplying liquid coating material, atomization air, pattern shaping air and pilot air to and for returning coating material from the spray head 41, as well as valves for controlling the flow of such material and air. The manifold 39 has a flat face 47 which abuts a flat face 48 on the spray head 41. The air and fluid passages in the manifold 39 connect at the faces 47 and 48 with corresponding passages in the spray head 41. Passages in the spray head 41 deliver the coating material and the atomization air to a nozzle assembly 49 and deliver the pattern shaping air to passages in air cap 50 for forming a spray of atomized coating material having a desired fan shaped pattern. The face 47 may be formed at any desired angle to the axis of the housing 36. As shown in FIG. 2, the spray gun 21 will discharge atomized coating material at an angle of about 60 degrees from the axis of the housing 36. Angles of from 0 degrees to 90 degrees from the housing axis may be selected to give the robot optimum flexibility in a particular coating operation.

FIG. 3 shows a section through the housing 36. The housing flange 37 has a plurality of spaced holes 53 for receiving bolts 54 which connect the flange 37 to the adaptor plate 35. The housing 36 has a generally tubular shaped central portion 55 between the flange 37 and the end 36. Two spaced brackets 56 are integrally formed on the interior of the central portion 55 for receiving and retaining the high voltage module 44. The brackets 56 have sides 58 which are spaced to receive a shell 59 of the high voltage module 44. The shell 59 is retained by inwardly directed flanges 60 at the tops of the sides 58. Thus, the module 44 is inserted longitudinally into the brackets 56 and is restrained from lateral movement.

A relatively large open area 57 extends through the central portion 55 outside of the brackets 56 for carrying the fluid and air hoses. The housing 36 is molded from an electrically non-conductive material capable of supporting the weight of the manifold 39 and the spray head 41, such as a glass fiber reinforced Nylon.

FIG. 4 shows details for a shell 59 for the high voltage module 44. The shell 59 also is molded from an electrically non-conductive material. A bracket 61 is attached to one end of the shell 59 for mounting the low voltage connector 45. The high voltage connector 46 is integrally molded into the opposite end of the shell 59. The connector 46 includes a plurality of concentric annular projections 62 separated by annular recesses 63. A high voltage electrode 64 is located at the center of the connector 46. The electrode 64 may be, for example, a spring projecting slightly from a central projection 65. The projections 62 and 65 and the recesses 63 function to increase the surface radially from the electrode 64 to prevent arcing or electrical break down. Conventional circuitry (not shown) may be mounted in the shell 59 for converting low voltage into a very high voltage for use in electrostatically charging the coating material. The circuitry may include, for example, an oscillator for converting a low voltage direct current into an alternating current, a voltage step up transformer for converting the low voltage alternating current into an intermediate level voltage, and a capacitance-diode ladder network for rectifying the intermediate level voltage and for multiplying the intermediate level voltage into the high voltage.

Details of the manifold 39 are shown in FIGS. 5-10. As will be seen in FIGS. 5 and 6, the manifold 39 has a body 69 which is generally circular in cross section and has a step 70 between a section 71 having the same diameter as the housing 36 and a section 72 of a smaller diameter which is received by the housing end 40. Threaded holes 73 are formed in the section 72 for receiving the bolts 42. To the front of the section 71, the face 47 extends at an angle to a central axis of the manifold 39 and the housing 36. The smaller manifold section 72 terminates at an end 74 which includes a high voltage electrical connector 75, a valve actuating solenoid 76 and the following hose connectors: a coating material inlet connector 77, an atomization air inlet connector 78, a pattern shaping air inlet connector 79, a pilot air inlet connector 80, a connector 81 for coating regulator pilot air, a connector 82 for dump valve pilot air, and a return or dump fluid outlet connector 83.

As shown in FIGS. 6 and 7, the coating material connector 77 connects through a passage 84 in the manifold body 69 to a pressure regulator 85 and thence through a passage 86 to an opening 87 at the manifold face 47. An O-ring seal 88 is located in the face 47 to surround the opening 87. The pressure regulator 85 is of a conventional type and includes a diaphragm assembly 89 and a valve popet 90 mounted in a stepped opening 91 in the manifold section 71. The diaphragm assembly 89 and the valve popet 90 are retained in the opening 91 by a cap 92 which is threaded into the opening 91. It should be noted that the cap 92 is exposed on the side of the manifold section 71 to allow service of the regulator 85 without the need to dismantle the housing 36 or the manifold 39. In assembling the regulator 85, a spring 93 and the valve popet 90 are positioned in an inner portion 94 of the stepped opening 91. The diaphragm assembly 89 is next positioned in the opening 91 and the cap is threaded into the opening. The diaphragm assembly 89 separates a coating material chamber 95 which connects with the passage 86 and connects through the valve popet 90 with the passage 84 from a regulator pilot air chamber 96. The coating regulator air connector 81 is connected through a passage 97 to the chamber 96. The coating material supplied at the opening 87 to the spray head 41 will have a pressure which is an inverse function of the regulator pilot air pressure. The regulator pilot air pressure is set from a remote location, for example, by the programmable controller 26 (FIG. 1).

Return fluid from the spray head 41 is received at an opening 98 at the manifold face 47. An O-ring 99 is mounted on the face 47 to form a seal surrounding the opening 98. The opening 98 is connected through a passage 100, a dump valve 101 and a passage 102 to the dump or return fluid connector 83. The valve 101 is identical to the pressure regulator 85 and includes a spring 103, a valve popet 104 and a diaphragm assembly 105 held in a stepped manifold opening 106 by a threaded cap 107. Dump valve pilot air is supplied from the connector 82 through a passage 108 to an air chamber 109 on one side of the diaphragm assembly 105. The pressure of pilot air in the chamber 109 determines when the valve 101 is open to allow fluid to flow from the spray head 41 or is closed. The fluid return may be used for a paint recirculation system wherein paint is continuously flowing to and from the spray head 41. Or, more commonly, the fluid return is used during a paint color change cycle. The programmable controller 26 may be programmed, for example, to supply solvent to the spray head at the completion of a coating operation. Most of the solvent is returned to the dump container 32 (FIG. 1) through the fluid return by controlling pilot air to open the dump valve 101. Only a small quantity of solvent need be discharged from the spray head 41 to clean the nozzle assembly 49. After solvent cleans the paint passages, air may be circulated through the material supply passages and the return passages to purge solvent from the passages. It is to be understood that various known operating cycles may be used to purge the coating material passages leading to and through the spray head 41.

Figure 8:
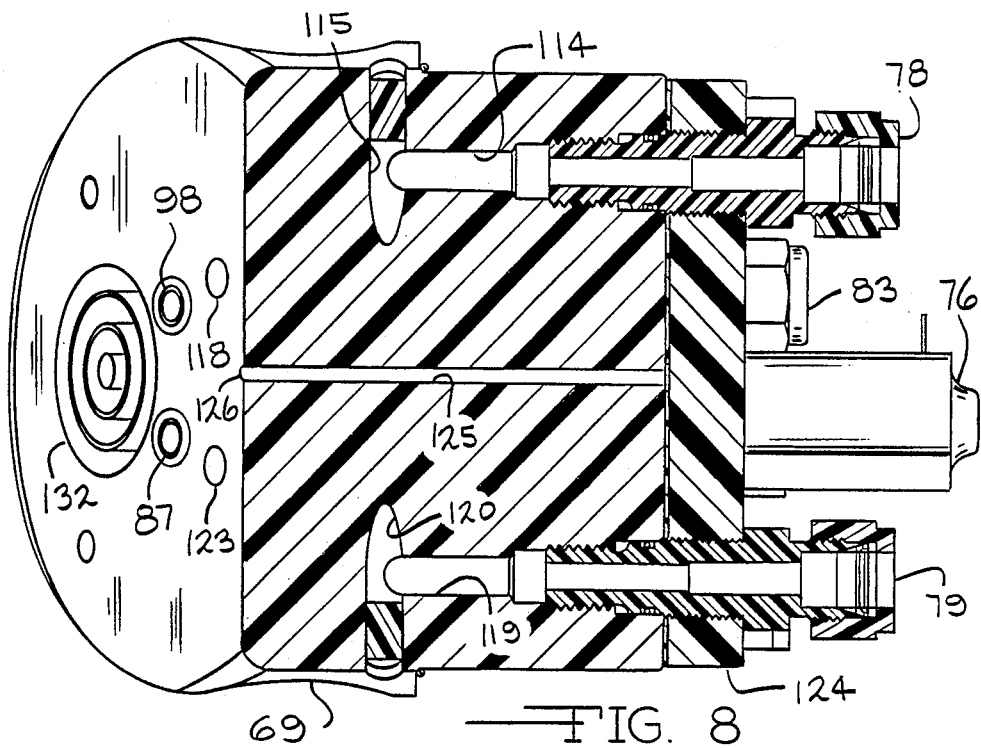
FIG. 8 is a cross sectional view taken along line 8—8 of FIG. 6.
Figure 9:
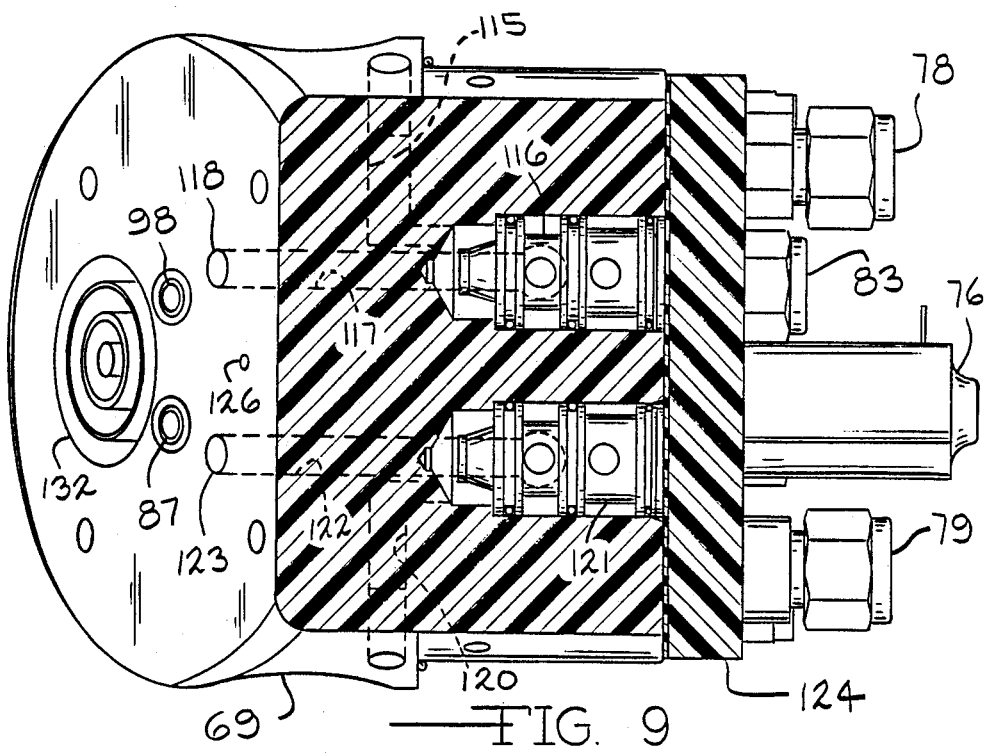
FIG. 9 is a cross sectional view taken along line 9—9 of FIG. 6.

Referring to FIGS. 6, 8 and 9, the flow paths through the manifold 39 for atomization air and pattern shaping air are shown. Atomization air enters a passage 114 in the manifold body 69 through the connector 78 and flows from the passage 114 through a passage 115, through a valve 116 and through a passage 117 to an opening 118 at the manifold face 47. Similarly, pattern shaping air enters through the connector 79 and flows through passages 119 and 120, through a valve 121 and a passage 122 to an opening 123 at the manifold face 47. The valves 116 and 121 are commercially available cartridge valves which are normally closed and open in response to pilot air.

When a voltage is applied to the valve actuating solenoid 76, an attached valve in a valve cover 124 is opened and pilot air is applied from the connector 80 simultaneously to open both valves 116 and 121, thus applying both atomization air and pattern shaping air to the spray head 41. Pilot air also is simultaneously applied through a manifold passage 125 to an opening 126 at the manifold face 47 to actuate a coating material trigger in the spray head 41. As will be described in detail below, the pilot air moves a piston in a chamber to actuate the trigger. The chamber is vented through a passage 127 through the manifold body 69.

Figure 10:
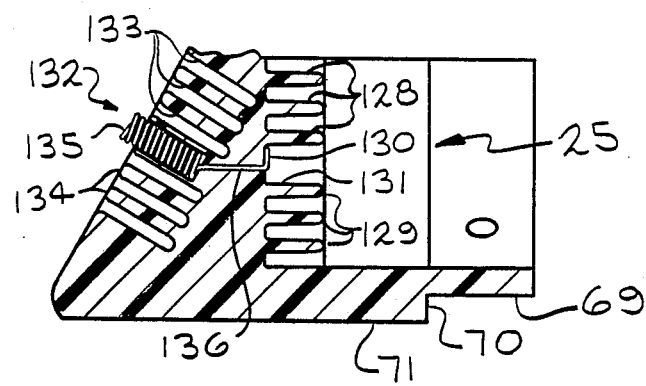
FIG. 10 is a fragmentary cross sectional view taken along line 10—10 of FIG. 6.
Figure 11:
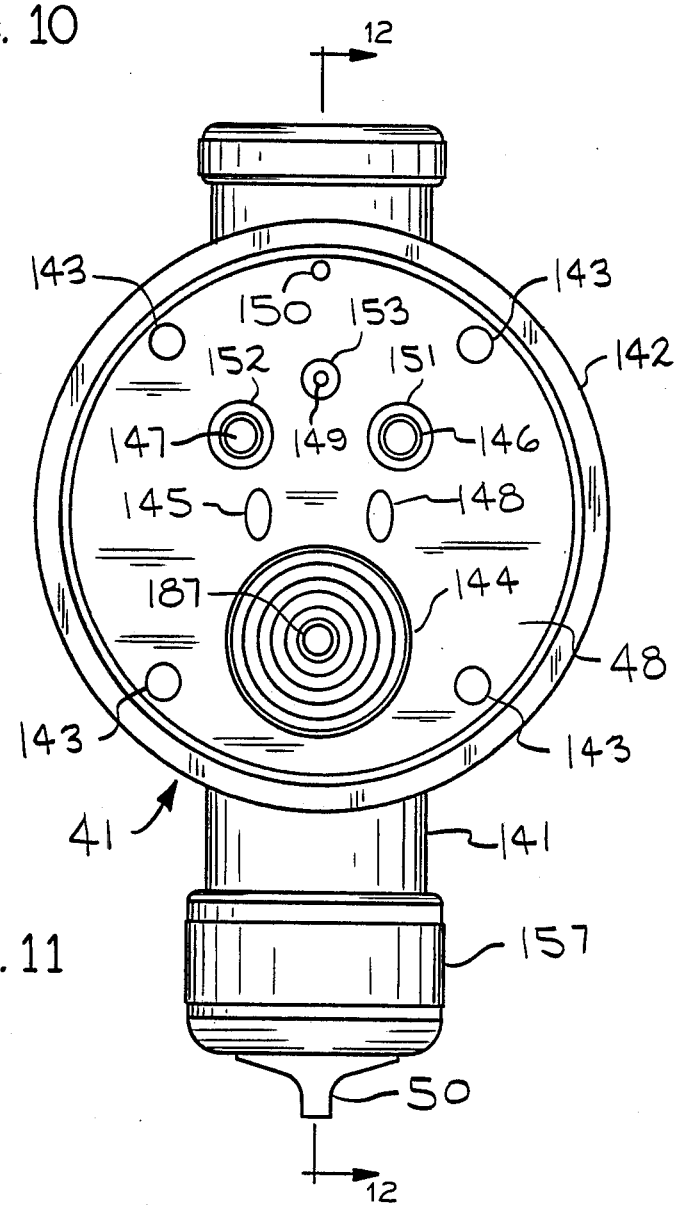
FIG. 11 is a rear view of the spray head.
Figure 12:
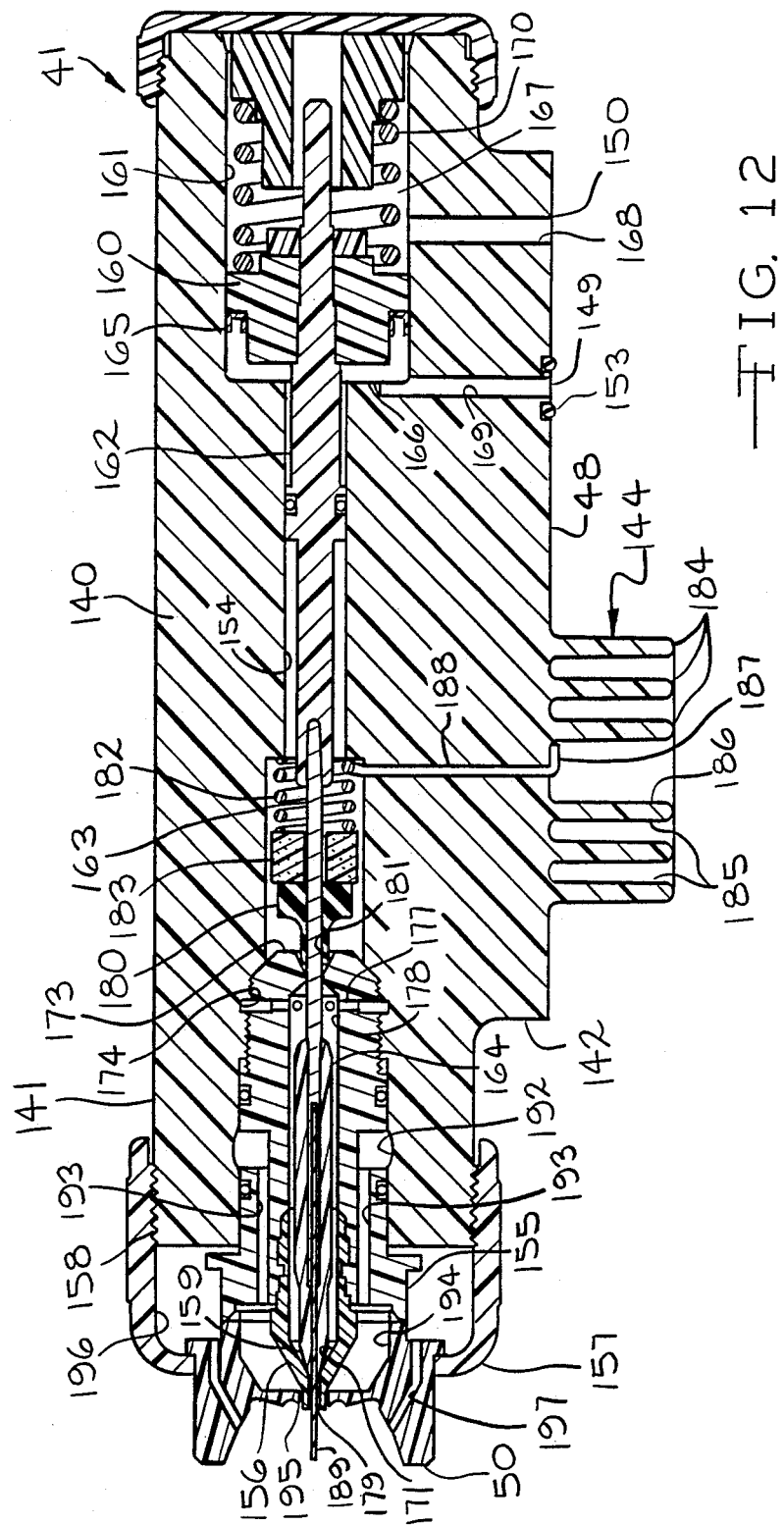
FIG. 12 is a cross sectional view taken along line 12—12 of FIG. 11.

FIG. 10 shows details of the high voltage connections through the manifold body 69. As previously stated, the manifold body is made from an electrically non-conductive material. The connector 75 is in the form of a plurality of concentric annular recesses 128 and projections 129 which are complementary to the annular projections 62 and recesses 63 on the high voltage module connector 46. An electrically conductive contact 130 is located in a center recess 131 for contacting the high voltage electrode 64 when the module connector 46 is inserted into the manifold connector 75. A connector 132 is formed at the manifold face 47. The connector 132 includes a plurality of concentric annular recesses 133 and projections 134. An compression spring electrode 135 is located at the center of the connector 132. A wire 136 passes through the manifold body 69 to connect the electrode 135 with the contact 130.

The spray head 41 is shown in detail in FIGS. 11–14. The spray head 41 includes a body 140 forming a spray gun barrel 141 and a circular mounting bracket 142. The bracket 142 forms the face 48 and includes a plurality of holes 143 for the bolts 43 which attach the spray head 41 to and align it with the manifold 39. When the spray head 41 is attached to the manifold 39, a high voltage connector 144 at the face 48 engages the manifold connector 132. At the same time, The face 48 includes a coating material opening 145, an atomization air opening 146, a pattern shaping air opening 147, a fluid return opening 148, a trigger valve pilot air opening 149 and a vent opening 150 which align with and connect, respectively, with the coating material opening 87, the atomization air opening 118, the pattern shaping air opening 123, the fluid return opening 98, the trigger valve pilot air opening 126 and the vent passage 127 on the manifold face 47. The O-ring seal 88 on the face 47 forms a seal around the coating material openings 87 and 145 and the O-ring seal 99 forms a seal around the fluid return openings 98 and 148. An O-ring seal 151 is mounted on the face 48 to form a seal around the atomization air openings 118 and 146, an O-ring seal 152 is mounted on the face 48 to form a seal around the pattern shaping air openings 123 and 147 and an O-ring seal 153 is mounted on the face 48 to form a seal around the trigger pilot air openings 126 and 149.

The spray gun barrel 141 has a stepped central opening 154. A fluid nozzle 155 is threaded into the opening 154 and a fluid tip 156 is threaded into the nozzle 154. The air cap 50 is clamped against the nozzle 155 by a retainer 157 which is threaded onto an end 158 of the barrel 141. A coating material trigger valve 159 is mounted within the stepped opening 154 and the fluid nozzle 155 for controlling the discharge of coating material from the nozzle assembly 49. The trigger valve 159 includes a piston 160, a piston rod 162, a rear needle section 163 and a front needle section 164. The piston 160 and a piston seal 165 are mounted to slide axially in an enlarged end 161 of the opening 154 to separate the opening end 161 into a pilot air chamber 166 and a chamber 167. The chamber 167 is vented to atmosphere through a passage 168 which leads to the vent opening 150 at the face 48. The pilot air opening 149 at the face 48 is connected through a passage 169 to the chamber 166. When the solenoid 76 is actuated, pilot air is supplied to the chamber 166 and the piston 160 is moved against the force of a return spring 170 in the chamber 167. Motion of the piston 160 is transmitted by the piston rod 162 and the rear needle section 163 to the front needle section 164 to move the front needle section 164 from a valve seat 171 in the fluid tip 156.

Figure 13:
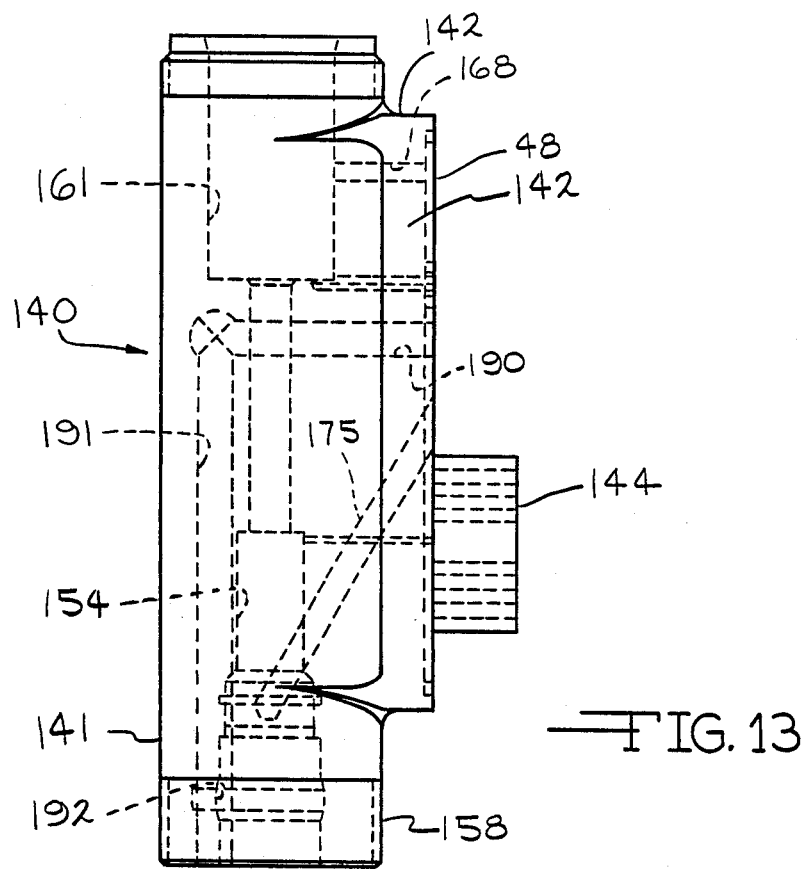
FIG. 13 is a side view of the spray head body.
Figure 14:
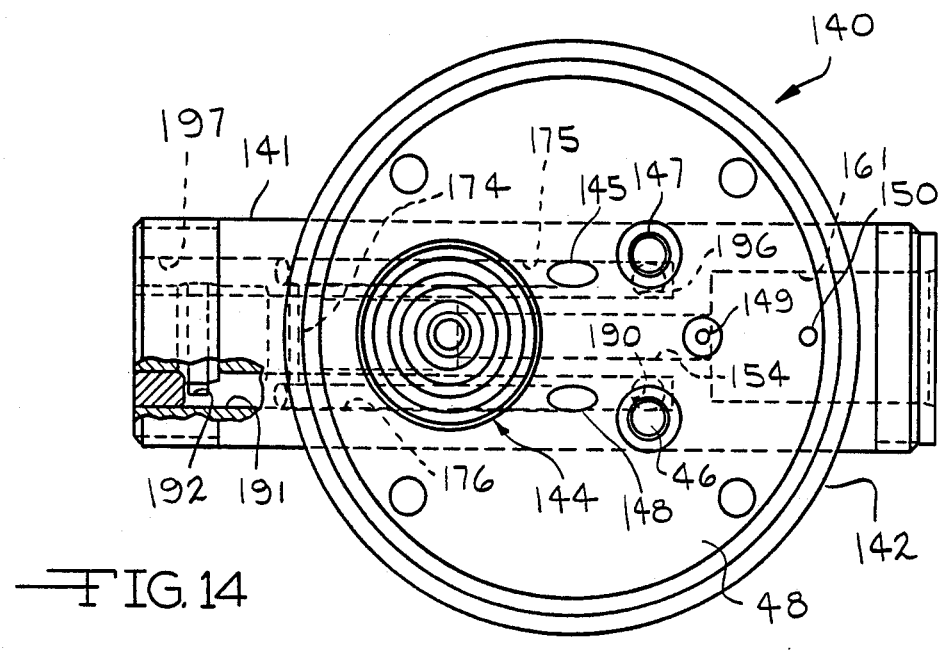
FIG. 14 is a partially broken away rear view of the spray head body.

The stepped barrel opening 154 defines an annular chamber 174 near an inner end 173 of the fluid nozzle 155. As best seen in FIGS. 13 and 14, the coating material opening 145 at the face 48 is connected through a passage 175 to one side of the chamber 174. The fluid return opening 148 at the face 48 is connected through a passage 176 to a diametrically opposite side of the chamber 174. The chamber 174 connects through radial passages 177 in the fluid nozzle 155 to a central chamber 178 in which the front needle section 164 is located. When pilot air moves the piston 160 and the front needle section 164 moves from the seat 171, coating material flows in the spray head 41 from the opening 145, through the passage 175, the chamber 174, the passages 177 and the chamber 178 and is discharged from an orifice 179 in the fluid tip 156.

A seal 180 allows the rear needle section 163 to reciprocate through a conical rear opening 181 in the fluid nozzle 155 into the fluid nozzle chamber 178 while preventing fluid leakage from the chamber 178. A spring 182 presses against a washer 183 to urge the seal 180 against the conical opening 181 and against the rear needle section 163.

The high voltage connector 144 on the spray head 41 includes a plurality of concentric annular projections 184 and recesses 185 which are complementary to the recesses 133 and the projections 134 on the manifold connector 132. In a central recess 186, an electrical contact 187 is arranged to connect with the high voltage electrode 135 on the connector 132. The contact 187 is electrically connected through a wire 188, the spring 182, the washer 183, and the rear needle section 163 to an electrode 189. Preferably, all other components of the spray head 41, except for the spring 170, are manufactured from electrically non-conductive materials to increase the safety of the spray gun 21. The electrode 189 extends through the front needle section 164 and projects coaxially through the orifice 179 for imparting an electrostatic charge to the coating material as it is discharged from the orifice 179 and atomized.

Atomization air enters the spray head 41 at the opening 146 and flows through passages 190 and 191 (FIGS. 13 and 14) to an annular chamber 192 formed in the stepped opening 154. From the chamber 192, atomization air flows through a plurality of passages 193 in the fluid nozzle 155 to an annular chamber 194 defined between the fluid nozzle 155, the fluid tip 156 and the air cap 50. Atomization air is discharged from the chamber 194 through an annular orifice 195 which surrounds the coating material orifice 179. The air cap 50 may be of a known design and may include additional orifices for directing air from the chamber 194 to enhance atomization.

Pattern shaping or fan air enters the spray head 41 at the opening 147 and flows through passages 196 and 197 to an annular chamber 196 defined between the gun barrel end 158, the fluid nozzle 155, the fluid tip 156 and the retainer 157. From the chamber 196, pattern shaping air is directed by air cap passages 197 against the atomized coating material to impart a flat or oval fan shape to the material pattern.

FIG. 15 shows in partially broken away top view of a modified embodiment of a spray gun housing and manifold 198 in accordance with the invention. The spray gun housing and manifold 198 operates with a spray gun similar to the spray gun 21. In the spray gun housing and manifold 198, the valve actuating solenoid 76 has been and replaced with two valve actuating solenoids 199 and 200 mounted in the housing 36. No changes are required in the spray head 41, the manifold body 69 or the housing 36. The valve cover 124 is replaced with a valve cover 124' which eliminates the mounting openings and passages for the eliminated valve actuating solenoid 76 and includes a hose connector 201 which is connected through a passage 202 to the pilot air inlet for the atomization air valve 116, a hose connector 203 which is connected through a passage 203 to the pilot air inlet for the pattern shaping air valve, and a hose connector 205 which is connected through a passage 206 to the trigger air passage 125.

The valve actuating solenoid 199 is responsive to an electric signal for opening an internal valve to apply pilot air through the hose 207, the connector 201 and the passage 202 for actuating the atomization air valve 116 and simultaneously through the hose 208, the connector 203 and the passage 204 for actuating the pattern shaping air valve 121. The valve actuating solenoid 200 is responsive to an electric signal for opening an internal valve to apply pilot air through a hose 209, the connector 205 and the passage 206 to the passage 125 for actuating the coating material trigger valve. The use of separate valves 199 and 200 permits the system controller to sequence operation of the spray gun 21' so that atomization air and pattern shaping air are turned on prior to opening the coating material trigger valve. The system controller can be programmed to provide any desired delay between operation of the valves 199 and 200.

From the above description, it will be seen that the spray gun 21 has a compact construction suitable for robot mounting. Further, valves for controlling coating material triggering and pressure regulation, atomization air, pattern shaping air and fluid return are located within inches of the spray gun nozzle assembly. This arrangement in combination with electric triggering to control pilot air significantly decreases the triggering time over systems having valves located remote from the spray gun. Since the valves are always located at the spray gun, several robot mounted spray guns in different spray booths will have the same response time. This allows initially generating a program in a teaching spray booth and uploading the program to several different coating robots without loss in quality or uniformity of the coating applied to the workpieces. Operating flexibility is enhanced by providing separate lines for supplying atomization air and pattern shaping air from a remote location. The separate air lines allow for remote pattern size adjustment by the system controller. The electrostatic power supply is located in the spray gun housing at the end of the robot arm to eliminate the need to run a high voltage cable along or through the robot arm. Further, the spray gun is designed to facilitate servicing with a minimum down time. The spray head may be quickly replaced, allowing for off line service. The coating material regulator and the fluid return valve in the manifold may be replaced without dismantling the spray gun. Other features and advantages of the spray gun will be apparent to those skilled in this art.

I claim:

1. A spray gun for mounting on a robot, said spray gun comprising a housing having first and second ends, means for attaching said first housing end to such robot, a valve manifold attached to said second housing end, said housing defining a passage for fluid conduits between said first and second housing ends, said valve manifold having a first surface outside said housing and a second surface opening into said housing, a spray head including a trigger valve and means for discharging on atomized liquid in response to the application of pilot air to said trigger valve, said spray head having a body removably attached to said first manifold surface, said manifold defining separate passage means between said first and second manifold surfaces for supplying liquid, atomization air, pattern shaping air and pilot air to said spray gun, normally closed first valve means located in said atomization air passage means responsive to pilot air for supplying atomization air to said spray head, normally closed second valve means located in said pattern shaping air passage means responsive to pilot air for supplying pattern shaping air to said spray head, and normally closed actuating valve means in said spray gun responsive to an electric signal for supplying pilot air simultaneously to said first and second valve means and for supplying pilot air to said trigger valve.

2. A spray gun for mounting on a robot, as set forth in claim 1, wherein said normally closed actuating valve means is responsive to an electric signal.

3. A spray gun for mounting on a robot, as set forth in claim 1, wherein said manifold includes a pneumatically controlled pressure regulator located in said liquid passage means, means remote from said manifold and such robot for supplying control air to said pressure regulator to control the pressure of liquid supplied to said spray head, said manifold further defining fluid return passage means for removing unsprayed liquid from both said manifold and said spray head, a pneumatically controlled return valve located in said return passage means, and means remote from said manifold and such robot for supplying control air to actuate said return valve to allow fluid to flow from said liquid passage means through said spray head to said return passage means.

4. A spray gun for mounting on a robot, as set forth in claim 1, and further including means for supplying atomization air from a location remote from said manifold and such robot to said manifold atomization air passage means, means for supplying pattern shaping air from a location remote from said manifold and such robot to said manifold pattern shaping air passage means, and means remote from said manifold and from such robot for independently controlling the pressures of such supplied atomization air and pattern shaping air.

5. A spray gun for mounting on a robot, as set forth in claim 1, wherein said normally closed actuating valve means comprises a single electrically actuated valve on said manifold for simultaneously supplying pilot air to said first and second valve means and to said trigger valve.

6. A spray gun for mounting on a robot, as set forth in claim 1, wherein said normally closed actuating valve means comprises third and fourth valve means located in said housing, said third valve means simultaneously supplying pilot air to said first and second valve means in response to an electric signal, and said fourth valve means supplying pilot air to said trigger valve in response to a second electric signal.

* * * * *